Patented July 27, 1954

2,684,912

UNITED STATES PATENT OFFICE 2,684,912

CERAMIC BODY

George M. Dreher, Pittsburgh, Pa.

No Drawing. Application August 31, 1950, Serial No. 182,624

2 Claims. (Cl. 106—57)

This invention relates to a ceramic body and is for a ceramic body which exhibits high resistivity to thermal shock and has a controllable and low porosity, and which, although having general utility, has especial utility when used in combustion boats for metallurgical testing purposes.

In metallurgical testing, the carbon and sulphur content of a metal may be determined by placing a sample of the metal in a shallow elongated refractory container which is usually designated as a "combustion boat" in the metallurgical art. Improved forms of such containers are shown in my copending applications Serial No. 20,934, filed April 14, 1948, now Patent No. 2,593,015, and Serial No. 139,045, filed January 17, 1950, now Patent No. 2,610,107. The combustion boat with metal sample to be tested is placed in a ceramic tube within an electric furnace and heated to a high temperature, usually in the order of about 2500° F. or higher for most ferrous materials. An oxidizing medium is then passed through the tube to burn the carbon and sulphur, and the end-products of combustion are analyzed to thereby determine the carbon and sulphur content of the metal.

The temperatures and oxidizing atmospheres encountered make ceramic refractory materials useful for the construction of combustion boats of the character referred to. However, most refractory materials have poor thermal shock characteristics rendering them unsuitable for this purpose. In addition, those refractory bodies which have a highly porous structure are unsuitable for use as combustion boats. Porous bodies are unsuitable for the reason that the metal will flow into the pores thereof, and the carbon and sulphur therein will not be completely liberated, thereby giving a false test analysis. Other difficulties such as poor molding characteristics and difficult firing characteristics are frequently encountered in ceramic bodies which otherwise have satisfactory thermal shock characteristics and low porosity suitable for the purpose.

As indicated above, one of the principal objects of this invention is to provide an improved ceramic body which is ideally suited for the construction of combustion boats, and which is superior in all respects. The ceramic body of this invention has been found to have much better thermal shock characteristics than other bodies commonly used in the manufacture of combustion boats, and can be fabricated so that it has no significant porosity. In addition, the body has strength to withstand the rugged treatment to which ceramic boats are subjected, and it avoids the undesirable molding and firing characteristics of material heretofore known for the purpose.

As will become apparent, the refractory composition of this invention consists essentially of the materials zircon and cordierite, the cordierite being present in varying percentages up to about 30% by weight of the zircon-cordierite content of the body. The porosity of the body decreases, as will be pointed out, with increases in the cordierite content in amounts up to about 20%. Increasing the cordierite content beyond the 30% point results in no noticeable advantage from the standpoint of porosity change, but has been found to have the disadvantage of narrowing the firing range.

The composition may be formed by using the cordierite ($2MgO \cdot 2Al_2O_3 \cdot 5SiO_2$) as such, but the materials talc ($3MgO \cdot 4SiO_2 \cdot H_2O$), clay ($Al_2O_3 \cdot 2SiO_2 \cdot 2H_2O$), and alumina ($Al_2O_3$), which combine upon firing to form cordierite, may be employed. These materials on firing combine as follows:

$$4(3MgO \cdot 4SiO_2 \cdot H_2O) + 7(Al_2O_3 \cdot 2SiO_2 \cdot 2H_2O) + 5(Al_2O_3) = 6(2MgO \cdot 2Al_2O_3 \cdot 5SiO_2)$$

The molecular weights, less water of crystallization of this equation is as follows:

(Talc) 1444.80+(clay) 1554.42+ 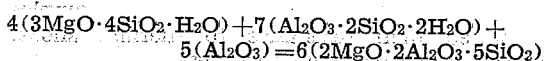
(alumina) 509.70=(cordierite) 3508.92

By percentages by weight, this formula may be given as follows:

(Talc) 41%+(clay) 44%+
(alumina) 15%=cordierite (100%)

When clay is used as one of the ingredients of the cordierite-forming materials, it is necessary to use a relatively long firing cycle in the order of about twenty-four hours to properly sinter the body. I have found that the firing cycle may be materially shortened by subjecting the clay to a calcining operation to release its water of crystallization content prior to firing the body. In such case, the calcined clay must be ground and pulverized before mixing with the other cordierite forming materials. The pulverized calcined clay is added in accordance with the above formula, 7 molecules of calcined clay being added to the alumina and talc as indicated above. Where calcined clay is used, the firing cycle is reduced and the body may be sintered in an hour or less. Instead of using calcined clay, pulverized alumina and silica may be used in the proportions indicated above, that is, 7 mols. of alumina and 14 mols. of silica may be substituted for the 7 mols. of calcined clay, and in such case, the advantages with respect to reduced time of firing cycle are retained.

On the basis of 100 parts by weight of zircon and cordierite, or zircon and cordierite-forming materials, the materials are mixed in the proportion of 70–100 parts by weight of zircon and 0–30 parts cordierite or cordierite-forming materials. As pointed out above, a greater proportion of cordierite may be employed, but will not result in any noticeable advantage as will be explained in greater detail below. To this mixture, there is added a suitable binder. The mixture is then pressed to the form or shape desired and fired to sinter the materials.

The following table lists several examples of the invention prepared as explained above:

| Example | Cordierite (Parts by Weight) | Zircon (Parts by Weight) | Porosity | Thermal shock resistivity |
|---|---|---|---|---|
| 1 | 0 | 100 | high | high. |
| 2 | 2.5 | 97.5 | ---do--- | Do. |
| 3 | 5 | 95 | ---do--- | Do. |
| 4 | 7.5 | 92.5 | medium | Do. |
| 5 | 10 | 90 | ---do--- | Do. |
| 6 | 12.5 | 87.5 | ---do--- | Do. |
| 7 | 15 | 85 | low | Do. |
| 8 | 17.5 | 82.5 | ---do--- | Do. |
| 9 | 20 | 80 | none | Do. |
| 10 | 25 | 75 | ---do--- | Do. |
| 11 | 30 | 70 | ---do--- | Do. |

In the examples of the invention given in the above table, the cordierite was produced by the use of cordierite-forming materials using silica and alumina in place of clay or calcined clay in the proportions given above. In all examples the mix with binder therein was granulated and dried to remove the water, and after pressing to form was fired at 2600° F. for about one hour. In addition, many bodies have been made using clay and calcined clay as part of the cordierite-forming materials, and such bodies gave equally good results.

As indicated in the above table, all examples exhibited high resistance to thermal shock. Specimens corresponding to these examples were tested for thermal shock by heating to above 2700° F. and then cooling by quenching in water, which the specimens withstood successfully. It will also be noted that the porosity of the body decreased as the cordierite content increased, and that all significant porosity disappeared when approximately 20 parts cordierite was used. The condition of no porosity in combustion boats is very desirable, as there will be no penetration of the metal into the ceramic body under this condition. Example 9 thus represents a preferred example of the invention since it is at this point that porosity disappears. Increasing the cordierite content beyond 20 parts as in Examples 10 and 11 does not result in any additional benefits, although bodies with such increased content will have the same desirable features as one containing only 20 parts cordierite. In the field of special utility of the invention, namely, in combustion boats, it will be noted from the above table that the lower limit of cordierite-containing materials is given by Example 7, or 15% cordierite. At about this point, the porosity of the body becomes noticeably low and may be used as a combustion boat in metallurgical testing. Accordingly, in the field of special utility of the invention, the range of cordierite or cordierite-containing materials may be given at about 15% or from approximately 15% to approximately 30%, and this range of cordierite represents the preferred practice of the invention.

In the formation of the bodies, the use of cordierite-forming materials gives an advantage in that the talc in such materials acts as a lubricant for the other particles during the molding operation and thus facilitates molding of the article.

From the foregoing, it will be apparent that the cordierite-zircon body of this invention has desirable thermal shock characteristics and a controllable porosity. Ordinarily, the combination of two ceramic compositions into a single body cannot be expected to result in a body having high thermal shock characteristics. Contrary to expectation, this is not the case with the body of this invention, and there is provided a body having improved thermal shock characteristics with a porosity rendering it suitable for use in the fabrication of combustion boats. Moreover, a body produced as described above can be made to have the non-porous characteristics of a cordierite body without the difficult firing characteristics of cordierite bodies, and at the same time provides thermal shock resistivity at least as good as zircon bodies, but without the porosity of zircon bodies.

Having thus described the invention with particular reference to the preferred practice, and having referred to certain modifications, it will be obvious to those skilled in the art that other changes and modifications may be made within the scope of the appended claims.

I claim:

1. A ceramic composition comprising a shaped and fired ceramic body consisting essentially of zircon and cordierite in the range of about 15 to 30% by weight of cordierite and 70 to 85% by weight of zircon, and having high thermal shock resistance and being substantially non-porous.

2. A fired refractory ceramic body having high thermal shock characteristics consisting essentially of zircon and cordierite in the range of about 7.5 to 30 per cent by weight of cordierite and 70 to 92.5 per cent by weight of zircon.

References Cited in the file of this patent

UNITED STATES PATENTS

| Number | Name | Date |
|---|---|---|
| 1,682,251 | Riddle | Aug. 28, 1928 |
| 2,277,705 | Kinzie et al. | Mar. 31, 1942 |
| 2,454,121 | Baker et al. | Nov. 16, 1948 |
| 2,511,679 | Thiess | June 13, 1950 |

FOREIGN PATENTS

| Number | Country | Date |
|---|---|---|
| 396,532 | Great Britain | 1933 |

OTHER REFERENCES

Ceramic Industry, January 1945, page 35.